United States Patent
Kim et al.

(10) Patent No.: US 8,683,979 B2
(45) Date of Patent: Apr. 1, 2014

(54) DUAL FUEL COMMON RAIL SYSTEM AND ENGINE USING SAME

(75) Inventors: Hoisan Kim, Dunlap, IL (US); Mark F. Sommars, Hopewell, IL (US)

(73) Assignee: Caterpillar Inc., Peoria, IL (US)

( * ) Notice: Subject to any disclaimer, the term of this patent is extended or adjusted under 35 U.S.C. 154(b) by 541 days.

(21) Appl. No.: 13/026,483

(22) Filed: Feb. 14, 2011

(65) Prior Publication Data

US 2012/0204835 A1 Aug. 16, 2012

(51) Int. Cl.
*F02M 69/46* (2006.01)
*F02M 69/52* (2006.01)

(52) U.S. Cl.
USPC ................................. 123/456; 123/304

(58) Field of Classification Search
USPC ............ 123/27 GE, 299, 304, 305, 456, 468, 123/469, 525; 239/416.5, 412, 413, 416, 239/417
See application file for complete search history.

(56) References Cited

U.S. PATENT DOCUMENTS

| | | |
|---|---|---|
| 4,416,229 A | 11/1983 | Wood |
| 4,499,862 A | 2/1985 | Baumer et al. |
| 4,700,672 A | 10/1987 | Baguena |
| 5,224,457 A | 7/1993 | Arsenault et al. |
| 6,328,230 B1 | 12/2001 | Prillwitz et al. |
| 7,373,931 B2 * | 5/2008 | Lennox et al. ............... 123/525 |
| 7,556,017 B2 | 7/2009 | Gibson |

(Continued)

FOREIGN PATENT DOCUMENTS

| | | |
|---|---|---|
| CA | 2524146 | 3/2006 |
| CA | 2532775 | 4/2006 |

(Continued)

OTHER PUBLICATIONS

V K Duggal et al; "May 2004 @Bullet NREL/SR-540-35911 Development of the High-Pressure Direct-Injected, Ultra Low-NOx Natural Gas Engine", May 31, 2004, pp. 1-6 XP0055089561, Retrieved from the Internet: URL:http://www.dieselduck.ca/machine/01%20prime%20movers/2004%20Developement%20of%20Natural%20Gas%20Low%20Nox%20engine.pdf [retrieved on Nov. 21, 2013] *p. 1-p. 6 *.

*Primary Examiner* — Stephen K Cronin
*Assistant Examiner* — Elizabeth Hadley
(74) *Attorney, Agent, or Firm* — Liell & McNeil (57) ABSTRACT

A dual fuel system for an engine includes a plurality of fuel injectors that each include an injector body with a tip component defining a plurality of gas nozzle outlets and a plurality of liquid nozzle outlets positioned for direct injection into one of the engine cylinders. Each of the fuel injectors is fluidly connected to a gaseous fuel common rail through a quill and an outer passage defined between an inner tube and an outer tube. Each of the fuel injectors is fluidly connected to a liquid fuel common rail through the quill and an inner passage defined by the inner tube. Each combination of an inner tube and outer tube extend into the engine housing between the quill and one of the fuel injectors. Each of the inner tubes extends through one of the outer tubes and is compressed between a conical seat on the quill and a conical seat on one of the fuel injectors.

20 Claims, 5 Drawing Sheets

(56) References Cited

U.S. PATENT DOCUMENTS

| | | |
|---|---|---|
| 7,627,416 B2 | 12/2009 | Batenburg et al. |
| 8,459,576 B2 * | 6/2013 | Kim et al. ............ 239/585.1 |
| 8,522,752 B2 * | 9/2013 | Kim et al. .............. 123/468 |
| 2002/0007805 A1 | 1/2002 | Green |
| 2002/0070295 A1 * | 6/2002 | Baker et al. ............ 239/533.3 |
| 2002/0195088 A1 | 12/2002 | Oprea |
| 2009/0150050 A1 | 6/2009 | Mashida |
| 2012/0255523 A1 * | 10/2012 | Kim et al. ............... 123/478 |
| 2012/0285417 A1 * | 11/2012 | Kim et al. ............... 123/299 |
| 2012/0291752 A1 * | 11/2012 | Hackett .................. 123/445 |
| 2012/0325180 A1 * | 12/2012 | Montgomery ........... 123/299 |
| 2012/0325350 A1 * | 12/2012 | Kim et al. ............... 137/596 |
| 2013/0047964 A1 * | 2/2013 | Kim ........................ 123/478 |
| 2013/0118448 A1 * | 5/2013 | Kim et al. ............... 123/299 |

FOREIGN PATENT DOCUMENTS

| | | |
|---|---|---|
| CA | 2635410 | 10/2008 |
| EP | 0610585 B1 | 2/1993 |
| EP | 0778410 A1 | 6/1997 |
| EP | 1719899 | 11/2006 |
| GB | 549419 | 4/1941 |
| JP | 61-229969 | 10/1986 |
| JP | 63-208664 | 8/1988 |
| JP | H01104930 | 4/1989 |
| JP | 2000064923 | 3/2000 |
| JP | 20031299913 | 8/2003 |
| WO | 9946496 | 9/1999 |
| WO | WO2008019415 A1 | 2/2008 |

* cited by examiner

DUAL FUEL COMMON RAIL SYSTEM AND ENGINE USING SAME

TECHNICAL FIELD

The present disclosure relates generally to dual fuel engines, and more particularly to a dual fuel common rail system for fueling an engine with gaseous and liquid fuels, respectively.

BACKGROUND

Gaseous fuel engines are known for their ability to burn clean relative to their compression ignition engine counterparts. However, gaseous fuels are well known for the difficulty in attaining successful ignition. Some gaseous fuel engines utilize a spark plug, whereas other engines are known for utilizing a small amount of distillate diesel fuel that is compression ignited to in turn ignite a larger charge of gaseous fuel. Practical spatial limitations in and around an engine often make it difficult to find space for all of the plumbing and hardware associated with supplying two different fuels to each combustion chamber. In this regard, Canadian patent 2,635,410 is of interest for teaching a dual fuel connector that relies upon a single quill that includes two different internal passages to facilitate fluid connection to two different fuel inlets of a fuel injector. However, this reference fails to teach a practical strategy for inhibiting fuel leakage between the two different fuels and from either fuel supply to atmosphere where the illustrated tube contacts the fuel injector. U.S. Pat. No. 7,373,931 teaches a dual fuel engine that utilizes a small quantity and compression ignited distillate diesel fuel to ignite a larger charge of gaseous fuel. This reference teaches the use of a fuel injector with nested needle valve members to facilitate injection of both the gaseous and liquid fuels from the same injector into each engine cylinder. However, the structure of the injector can lead to cross leakage between fuels, leakage of fuel into the engine cylinder and stacked tolerances that may lead to substantial performance variations when the fuel injectors are mass produced. In addition, the injector structure inherently requires different injection patterns depending upon whether the fuels are being injected individually or at the same time.

The present disclosure is directed toward one or more of the problems set forth above.

SUMMARY OF THE DISCLOSURE

In one aspect, an engine includes an engine housing defining a plurality of cylinders. A dual fuel system includes a plurality of fuel injectors that each include a tip component defining a plurality of gas nozzle outlets and a plurality of liquid nozzle outlets positioned for direct injection into one of the cylinders. The dual fuel system includes a plurality of outer tubes and a plurality of inner tubes each extending between a quill and one of the fuel injectors. The inner tubes are positioned within the outer tubes and compressed between a conical seat on the quill and a conical seat on one of the fuel injectors. The dual fuel system also includes a gaseous fuel common rail fluidly connected to each of the fuel injectors through the quill and an outer passage defined between the inner tube and the outer tube. The dual fuel system also includes a liquid fuel common rail fluidly connected to each of the fuel injectors through the quill and an inner passage defined by the inner tube.

In another aspect, a dual fuel system includes a plurality of fuel injectors that each include an injector body with a tip component defining a plurality of gas nozzle outlets and a plurality of liquid nozzle outlets. A plurality of inner tubes and outer tubes extending between a quill and one of the fuel injectors. Each of the inner tubes is positioned within a respective one of the outer tubes and is compressed between a conical seat on the quill and a conical seat on one of the fuel injectors. A gaseous fuel common rail is fluidly connected to each of the fuel injectors through the quill and an outer passage defined between the inner tube and the outer tube. A liquid fuel common rail is fluidly connected to each of the fuel injectors through the quill and an inner passage defined by the inner tube. A plurality of first compression load adjusters are each operably coupled to adjust a compression load on a different one of the inner tubes. A plurality of second compression load adjusters are each operably coupled to adjust a compression load on a different one of the outer tubes.

In still another aspect, a method of operating an engine with a dual fuel system includes injecting gaseous fuel into an engine cylinder through a plurality of gas nozzle outlets of a plurality of fuel injectors. Liquid fuel is injected into the engine cylinder through a plurality of liquid nozzle outlets. Liquid fuel is moved from a liquid common rail to one of the fuel injectors through a quill and inner passage defined by an inner tube during a liquid fuel injecting event. Gaseous fuel is moved from a gaseous fuel common rail to one of the fuel injectors through the quill and an outer passage defined between the inner tube and an outer tube during a gaseous fuel injection event. Liquid fuel leakage into the gaseous fuel is inhibited by compressing the inner tube between a conical seat on the quill and a conical seat on one of the fuel injectors. Gaseous fuel leakage into the liquid fuel is inhibited by pressurizing the liquid fuel rail to a greater magnitude than the gaseous fuel rail. Gaseous fuel leakage into the engine cylinder is inhibited by locating the gaseous nozzle outlets and the liquid nozzle outlets in a tip component of one of the fuel injectors. The injected gaseous fuel is ignited by compression igniting liquid fuel.

DETAILED DESCRIPTION

Figure 1:
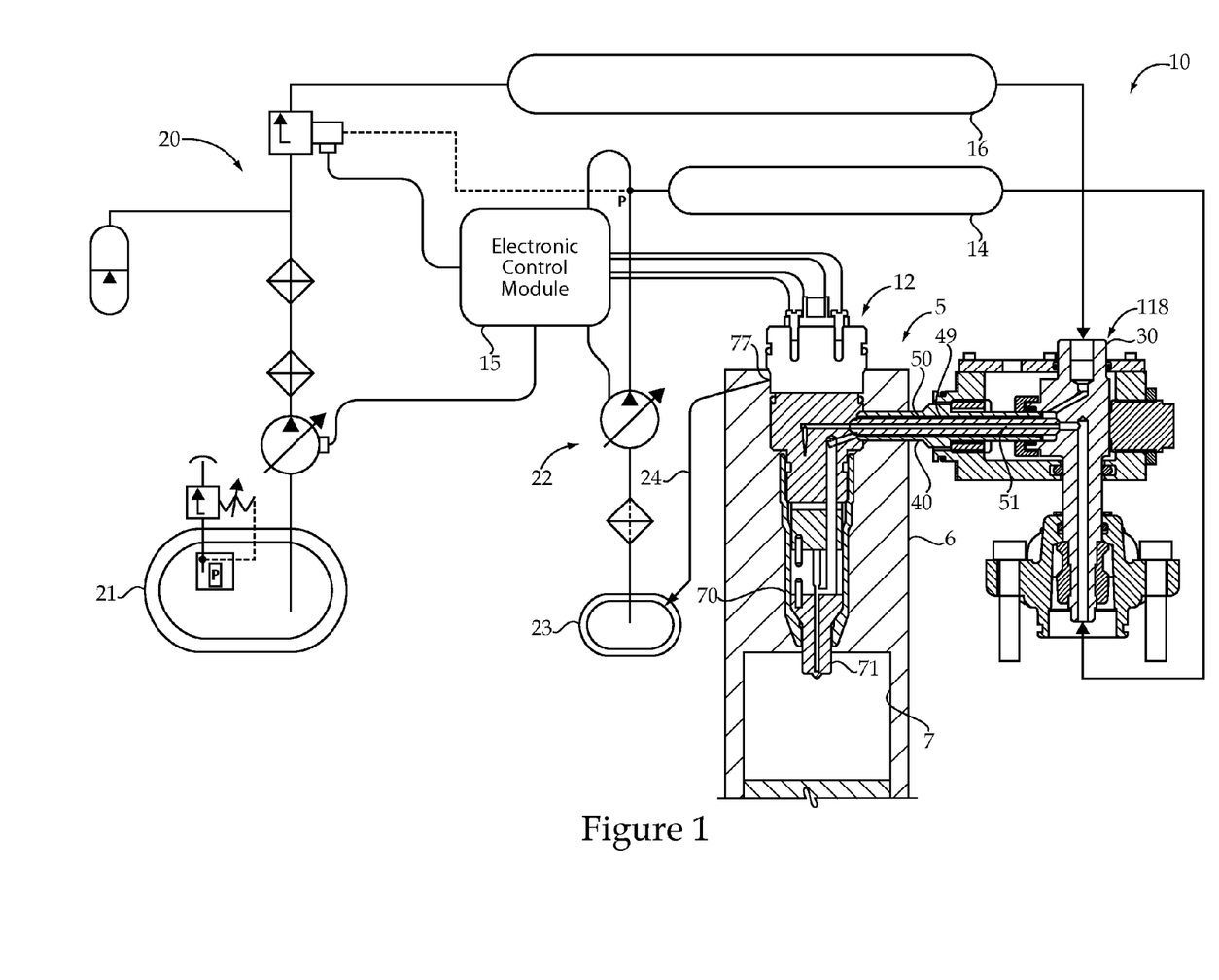
FIG. 1 is a schematic view of an engine and dual fuel common rail system according to the present disclosure.

Referring to FIG. 1, an engine 5 according to the present disclosure utilizes a dual fuel common rail system 10. Engine 5 includes an engine housing 6 that defines a plurality of cylinders 7, only one of which is shown. The dual fuel system 10 includes a plurality of fuel injectors 12 (only one shown) that each include an injector body 70 with a tip component 71 positioned for direct injection of gaseous fuel and/or liquid fuel into one of the engine cylinders 7. The dual fuel system 10 includes a plurality of outer tubes 50 and inner tubes 40 that each extend into engine housing 6 between a quill 30 and one of the fuel injectors 12. Each of the inner tubes 50 is compressed between a conical seat on an associated quill 30 and a conical seat on one of the fuel injectors 12. Thus, each engine cylinder 7 has one associated fuel injector 12, one outer tube 40, one inner tube 50 and one quill 30. The dual fuel system 10 includes a gaseous fuel common rail 16 that is fluidly connected to each of the fuel injectors 12 through one of the quills 30 and an outer passage 49 defined between an inner tube 50 and an outer tube 40. A liquid fuel common rail 14 is fluidly connected to each of the fuel injectors 12 through one of the quills 30 and an inner passage 51 defined by the inner tube 50.

An electronic controller 15 is in control communication with each of the fuel injectors 12 to selectively control the timing and quantity of both gaseous and liquid fuel injection events. Electronic controller 15 is also in control communication with a gas pressure control device 20 that is operably coupled to control the pressure in gaseous fuel common rail 16, and also in control communication with a liquid pressure control device 22 operably coupled to control the pressure in liquid fuel common rail 14. Although individual gases, such as methane, propane and the like are within the scope of the present disclosure, natural gas containing a mixture of gas species is particularly applicable to the present disclosure. In addition, the liquid fuel is chosen for the ability for compression ignition at the compression ratio of engine 5. For instance, the liquid fuel may be distillate diesel fuel or some other liquid fuel that is suitable for compression ignition to in turn ignite a charge of gaseous fuel in one of the engine cylinders 7.

In the illustrated embodiment, natural gas is maintained in a liquid state in a cryogenic liquefied natural gas tank 21. A variable displacement cryogenic pump is controlled by electronic controller 15 to pump liquefied natural gas through filters and a heat exchanger for expansion into a gas that is maintained in an accumulator. The gas pressure control device 20 according to the present disclosure includes an electronically controlled valve that supplies a controlled quantity of gaseous fuel from the supply side (accumulator) to the gaseous fuel common rail 16. This described supply strategy for natural gas is particularly suitable when engine 5 is mounted on a moving machine, such as a mining truck or the like. On the otherhand, if engine 5 were stationary, a gas pressure control device may be connected to a source of available natural gas and then compressed and fed to gaseous fuel common rail 16 in a manner that is controlled by electronic controller 15 to maintain a desired pressure in the rail 16.

The liquid fuel supply to liquid fuel common rail 14 begins at a tank 23. In the illustrated embodiment, the liquid fuel pressure control device 22 includes a high pressure common rail fuel pump of a type well known in the art whose output can be controlled by electronic controller 15 to maintain some desired pressure in liquid common rail 14. Another alternative might include fixed displacement pump and a rail pressure control valve that returns a quantity of the fuel back to tank 23 in order to control pressure in liquid fuel common rail 14. Any of these alternative strategies fall within the contemplated scope of the present disclosure.

In the event that engine 5 is utilized in a moving machine, the present disclosure contemplates liquefied natural gas tank 21 having a larger capacity (maybe 65% greater volume) than the distillate diesel fuel tank 23 in order to account for the expected ratios of consumption from both tanks when operating in a standard dual fueling configuration in which maybe over 90% of the fuel delivery to engine 5 is in the form of natural gas and less than 10% in the form of distillate diesel fuel, by mass. This difference in sizing of tanks 21 and 23 also accounts for the densities of the respective liquids as well as the different heating values of the two fuels, as well as accounting for the fact that the natural gas is stored as a liquid but injected as a gas, whereas the distillate diesel fuel is stored and injected as a liquid into engine 5. When operating in a dual fueling mode corresponding to standard operation, electronic controller 15 is configured to maintain the gaseous fuel common rail at a medium low pressure and the liquid fuel common rail 14 at a medium high pressure. If engine 5 is operating in a limp home fueling mode, the electronic controller 15 may be configured to maintain the gaseous fuel common rail 16 at a low pressure and the liquid common rail 14 at a high pressure. For the sake of clarity, the identified high pressure is greater than the medium high pressure, which is greater than the medium low pressure, which is greater than the low pressure.

Figure 2:
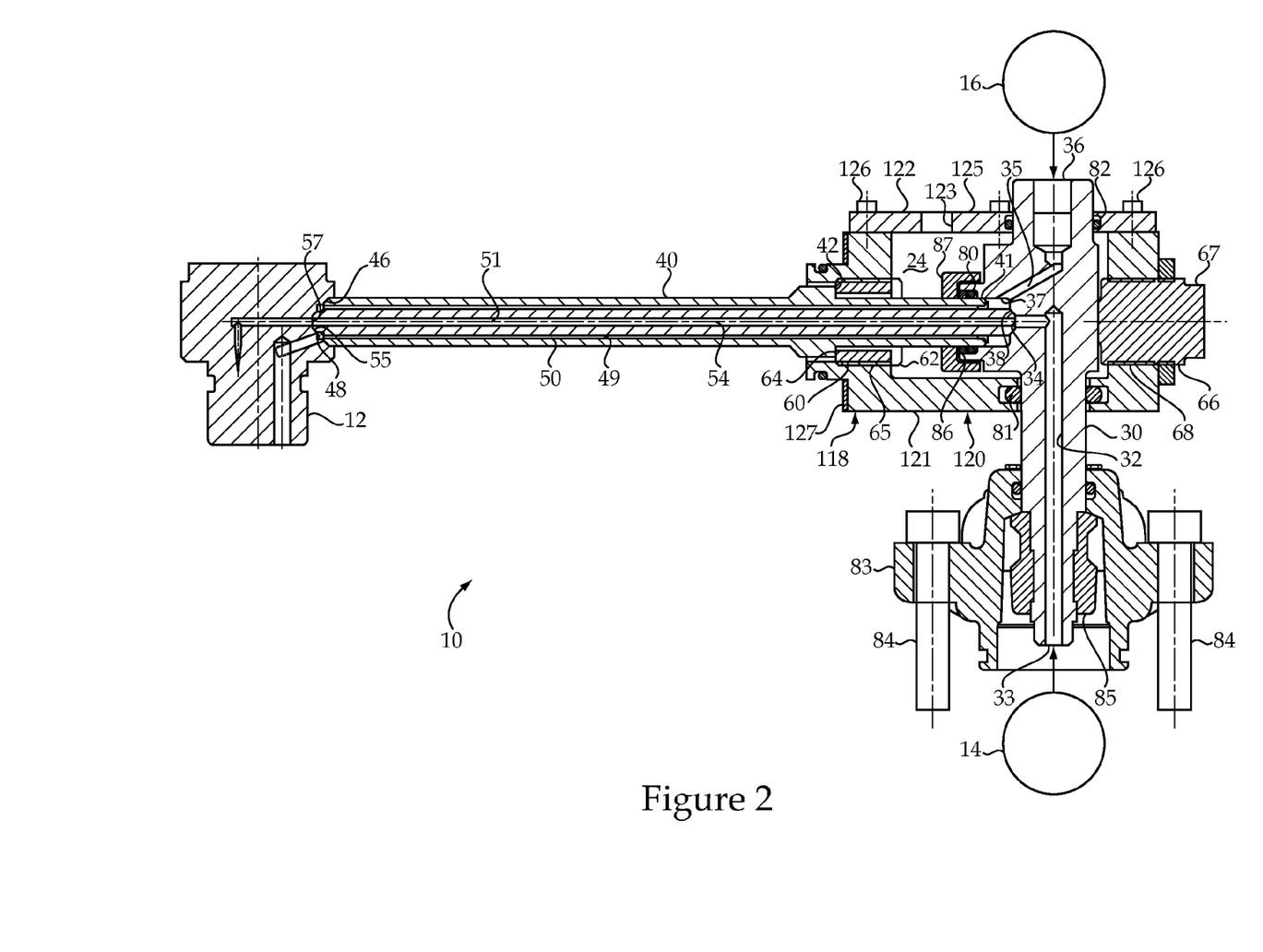
FIG. 2 is a side sectioned view of a portion of the dual fuel system of FIG. 1.

Referring to FIG. 2, the dual fuel common rail system 10 includes a coaxial quill assembly 118 fluidly connecting each fuel injector 12 with liquid and gas common rails 14, 16, respectively. Although the concepts of the present disclosure could apply to a variety of fuels for different types of engines, the illustrated embodiment is particularly suited for a gaseous fuel engine that utilizes distillate diesel fuel for compression ignition. In other words, an engine associated with dual fuel common rail system 10 might primarily burn liquefied natural gas supplied form second common rail 16, and ignite that charge in the engine combustion space by compression igniting a smaller charge of distillate diesel fuel from common rail 14 during a combustion event.

Coaxial quill assembly 118 includes a quill 30 at least partially positioned in a block 120. The quill includes a first fuel passage 32 extending between a first fuel inlet 33, which is fluidly connected to first common rail 14, and a first fuel outlet 34. Quill 30 also defines a second fuel passage 35 extending between a second fuel inlet 36, which is fluidly connected to second common rail 16, and a second fuel outlet 37. Quill 30 is fluidly connected to rails 14 and 16 using known hardware (e.g., fittings) and techniques. Fuel from first common rail 14 is moved through an engine housing 6 (engine head) via an inner passage 51 through inner tube 50, while fuel from second common rail 16 is moved to fuel injector 12 in an outer passage 49 defined between inner tube 50 and an outer tube 40. Inner tube 50 may be of a familiar construction to those skilled in the art, in that it includes rounded or conical ends that are compressed between a conical seat 38 of quill 30 and an inner conical seat 55 of fuel injector 12. Thus, the fluid passage 51 within inner tube 50 extends between first fuel outlet 34 of quill 30 and an inner fuel inlet 57 of fuel injector 12. Outer tube 40, which may have no contact with inner tube 50, has an inner diameter larger than an outer diameter of inner tube 50 in order to define an elongate outer passage 49 that opens on one end to second fuel outlet 37 of quill 30 and at its other end to an outer fuel inlet 48 of fuel injector 12. Outer tube 40 includes a rounded or conical end that is compressed into sealing contact with outer conical seat 46 of fuel injector 12. The outer fuel inlet 48 opens between the inner diameter of tube 40 and the outer surface of inner tube 50. Thus, fuel injector 12 defines an outer conical seat 46 that concentrically surrounds an inner conical seat 55. In addition, the fuel injector 12 includes an inner fuel inlet 57 surrounded by the inner conical seat 55, and an outer fuel inlet 48 positioned between the inner conical seat 57 and the outer conical seat 46.

Outer tube 40 is compressed between quill 30 and the fuel injector 12. In particular, outer tube 40 includes a rounded or conical end in sealing contact with outer conical seat 46 and an opposite end received in a bore defined by quill 30. One end 41 outer tube 40 is sealed via an O-ring 80 that is positioned in a space 45 between outer tube 40 and quill 30. O-ring 80 is maintained in place against the pressure from second common rail 16 by a back up ring 86 held in place by a cap 87 threaded to quill 30. Outer tube 40 is compressed onto outer seat 46 of fuel injector 12 by an axial force applied to a load shoulder 42 by a compression load adjuster 60 that includes a contact surface 64 in contact with load shoulder 42. Compression load adjuster 60 includes outer threads 65 that mate with a set of inner threads defined by base 121 of block 120, and includes a tool engagement surface 62 located in hollow interior 124 of block 120 to facilitate adjusting a compression load on outer tube 40. Thus, leakage of the second fuel from common rail 16 to atmosphere is inhibited by setting a compression load on the outer tube 40 with compression load adjuster 60 above a predetermined threshold to facilitate a seal at outer conical seat 46, and by sealing the other end with o-ring 80.

Sealing at opposite ends of inner tube 50 is facilitated by a separate load adjuster 66 that includes threads 68 mated to internal threads defined by base 121 of block 120. Load adjuster 66 includes a tool engagement surface 67 located outside of block 20 that facilitates movement of compression load adjuster 66 along a common centerline 54. In other words, compression load adjuster 70 pushes along common centerline 54 against quill 30 to compress inner tube 50 between conical seat 38 of quill 30 and conical seat 55 of fuel injector 12. Because one end 41 of outer tube 40 can slide within quill 30, the respective compression loads on inner tube 50 and outer tube 40 can be adjusted independently to better insure proper sealing at all of the conical seats 38, 55 and 46. Thus, leakage of the first fuel originating from common rail 14 into the second fuel is inhibited by setting a compression load on the inner tube 50 above a predetermined threshold with compression load adjuster 66. In addition, leakage of the second fuel from common rail 16 into the first fuel from common rail 14 may include setting the pressure in common rail 14 higher than the pressure in common rail 16. Outer tube 40, inner tube 50, compression load adjuster 60, compression load adjuster 70, conical seat 38, inner conical seat 55 and outer conical seat 46 all share a common centerline 54. Other sealing strategies for one or both of inner tube 50 and outer tube 40 apart from that described in relation to the drawings also fall within the contemplated scope of the present disclosure.

As shown, quill 30 may be at least partially positioned within block 120, which includes a base 121 and a cover 122 that may be attached to base 121 by a plurality of fasteners 126. Base 121 may include a flange that facilitates attachment of block 120 to an engine head (housing 6) via bolts 128. As shown in the Figures, the first fuel inlet 33 and the second fuel inlet 36 of quill 30 may be located outside of block 120. A shim 127 may be included to adjust the distance between conical seat 38 and conical seat 57 to compensate for geometrical tolerances in the fuel system and engine components. Any of the second fuel that manages to leak past O-ring 80 into hollow interior 124 of block 120, may be vented to atmosphere via vent opening 123. Thus, vent opening 123 might be eliminated in a case where the fuel in common rail 16 is not gaseous at atmospheric pressure. Except for vent opening 123, hollow interior 24 may be substantially closed via an O-ring 81 that is in contact with quill 30 and block 120 and surrounds first fuel passage 32. In addition, a second O-ring 82 may be in contact with quill 30 and block 120 and surround the second fuel passage 35. Thus, vent opening 123 extends between hollow interior 125 and an outer surface 125 of block 120, which is exposed to atmosphere.

Coaxial quill assembly 118 may also include a flange 83, collar 85 and bolts 84 to facilitate a sealed fluid connection between quill 30 and common rail 14. Although co-axial quill assembly 118 is illustrated as including a separate block 120 and quill 30, those skilled in the art will appreciate that the functions and structures of those two components could be merged into a single component without departing from the present disclosure.

Figure 3:
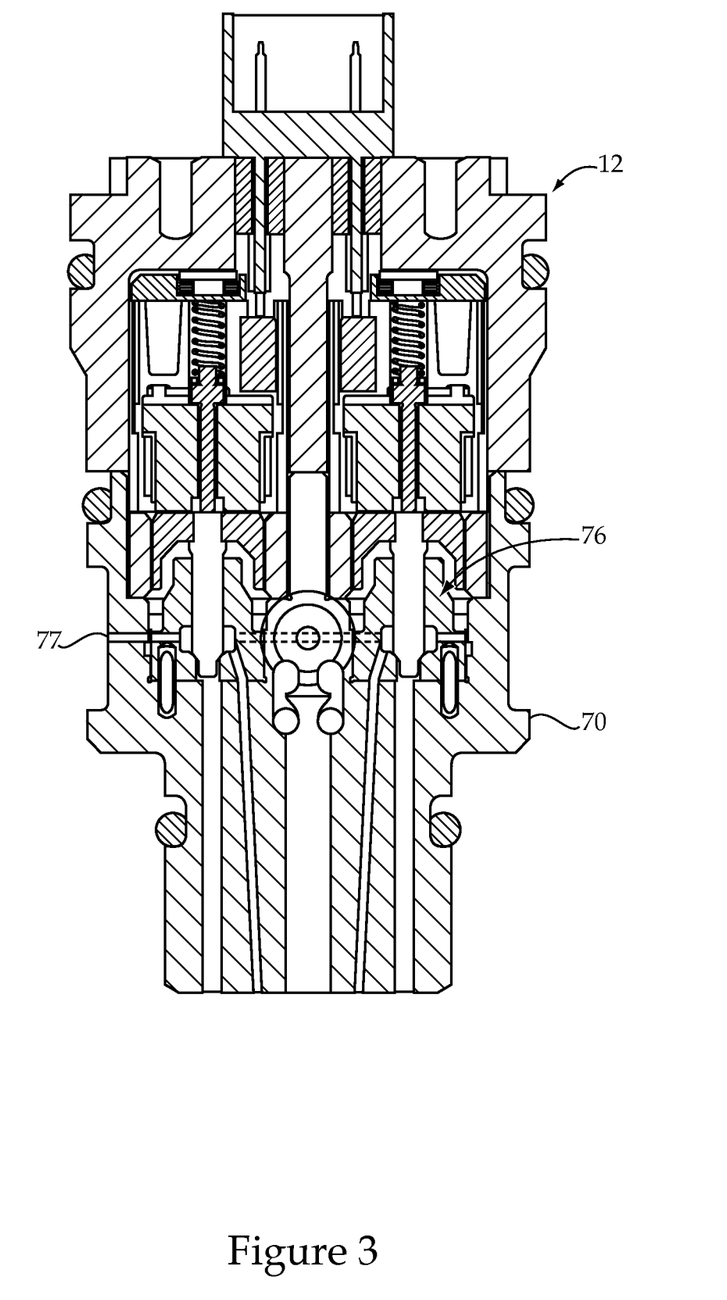
FIG. 3 is a sectioned side view of a top portion of one of the fuel injectors from FIG. 1.
Figure 4:
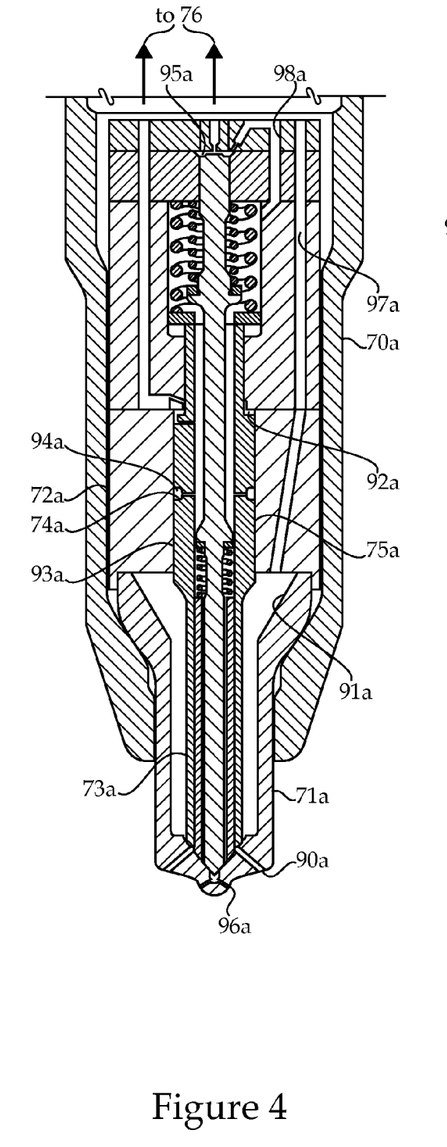
FIG. 4 is a sectioned side view of a bottom portion of a fuel injector according to one aspect of the present disclosure.
Figure 5:
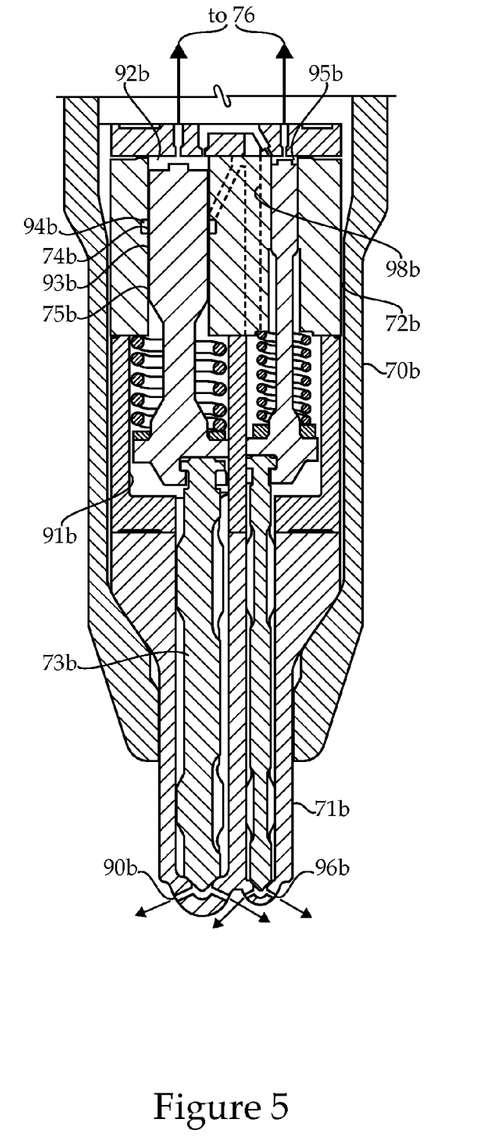
FIG. 5 is a sectioned side bottom portion view of a fuel injector according to another aspect of the present disclosure.

Referring now to FIGS. 3-5, each of the fuel injectors 12 includes two control valves 76 that are individually actuated via respective electrical actuators in control communication with electronic controller 15. In the illustrated embodiment, the two control valves 76 are each two way valves that open and close respective passageways to a low pressure drain outlet 77. As shown in FIG. 1, drain outlet 77 is fluidly connected to tank 23 via a drain return line 24. Thus, those skilled in the art will recognize that all of the control functions for fuel injector 12 are performed using the liquid fuel as a hydraulic medium in a manner well known in the art. FIGS. 4 and 5 show two different versions of a bottom portion of fuel injector 12. FIG. 4 showing a version in which the fuel injector has concentric sets of gas nozzle outlets 90a and liquid fuel nozzle outlets 96a, whereas FIG. 5 shows a configuration in which the gas nozzle outlets 90b are side by side with the liquid fuel nozzle outlets 96b. Identical features in the two different fuel injector versions are identified with the same numerals, but the numerals include an "a" in the case of the dual concentric configuration of FIG. 4, and include a designation "b" in the case of the side by side version of FIG. 5. In both versions, the respective gas needle 73 and liquid needle seat at different locations on the same tip component 71 of the injector body 70.

Figure 6:
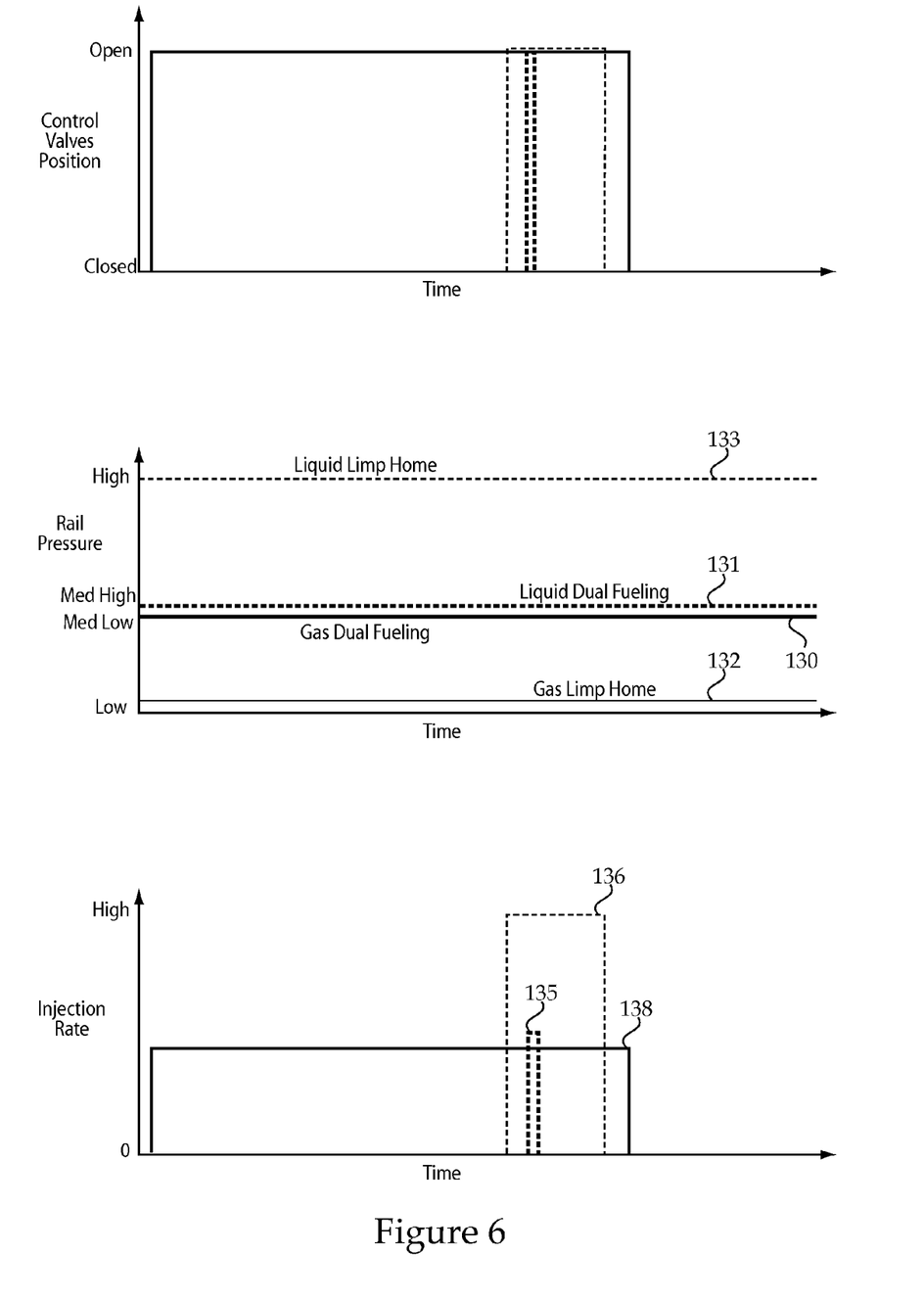
FIG. 6 is a series of graphs showing control valve positions, gaseous and liquid fuel rail pressures and injection rates verses time for the dual fuel system of FIG. 1 when operating in a dual fueling mode and a limp home mode.

Referring in addition to FIG. 6, during a gas injection event, one of the two control valves 76 is actuated to fluidly connect a pressure control chamber 92 to drain outlet 77. When this is done, pressure in control chamber 92 drops allowing a gas needle 73 to lift toward an open position against the action of a biasing spring to fluidly connect a gas nozzle chamber 91 to gas nozzle outlets 90. When fuel injector 12 is in a gas injection configuration, the liquid fuel common rail 14 is fluidly connected to drain outlet 77 since pressure control chamber 92 is always fluidly connected to a liquid nozzle supply passage 98 through a small orifice. Liquid nozzle supply passage is always fluidly connected to inner fuel inlet 57 (FIG. 2). When the two control valves 76 are in a liquid injection configuration, the other of the two valves is actuated to fluidly connect the liquid common rail 14 to the drain outlet 77 through a second pressure control chamber 95, which is also always fluidly connected to high pressure in liquid nozzle supply passage 98. The two control valves 76 also have a combined injection configuration at which both of the two control valves 76 are moved to an open position so that the liquid fuel common rail 14 is fluidly connected to the drain outlet 77 through the first pressure control chamber 92 and parallel through the second control pressure chamber 95. Finally, the two control valves 76 have a non-injection configuration at which the liquid fuel common rail 14 is blocked from the drain outlet 77 by having both of the two control valves 76 in a closed position.

In both versions of fuel injector 12, a gas needle 73 is positioned completely inside of injector body 70 with a guide surface 75 extending in a guide component 72 of injector body 70 between the first pressure control chamber 92 and the gas nozzle chamber 91. The gas nozzle chamber 91 is always fluidly connected to the gaseous fuel common rail 16, and is therefore at about the same pressure as the gaseous fuel common rail 16. A segment 74 of gas needle 73 and the guide component 72 define a portion of an annular volume 94 that is always fluidly connected to liquid common rail 14 via a branch passage that is fluidly connected to liquid nozzle supply passage 98. This structure maintains lubricity in the guide clearance 93.

INDUSTRIAL APPLICABILITY

The dual fuel common rail system 10 of the present disclosure finds general applicability to any engine that utilizes two fuels in the combustion space of an associated engine. These two fuels may be the same fuel at two different pressures, or may, as in the illustrated embodiment be different fuels. Although the present disclosure could apply to spark ignited engines utilizing appropriate fuels, the present disclosure finds particular applicability in gaseous fuel engines that utilize a relatively large charge of natural gas that is ignited via compression ignition of a small charge of distillate diesel fuel originating from common rail 14. The coaxial quill assembly 118 of the present disclosure can facilitate movement of both fuels to a fuel injector 12 mounted in the head 6 of an engine 5 via a single bore through the engine head associated with each fuel injector 12 of the engine 5. This strategy conserves valuable space in and around the engine.

By utilizing a block 120 that is bolted to the outer surface of the engine head, separate load adjusters 60 and 66 can be utilized to independently load the inner tube 50 and outer tube 40 onto the conical seats 57 and 46, respectively of fuel injector 12 to inhibit fuel leakage between the fuels and to inhibit fuel leakage to atmosphere outside of fuel injector 12, while accounting for slight dimensional differences associated with each fuel injector fluid connection.

When in operation, the first fuel (distillate diesel) at a first pressure moves from first common rail 14 through the first fuel passage 32, through inner tube 50 and into fuel injector 12. The second fuel at a second pressure is moved from the second common rail 16 through the second fuel passage 35, through the outer passage 49 between outer tube 40 and inner tube 50 and into fuel injector 12. Leakage of the second fuel to the first fuel may be inhibited by setting the pressure in common rail 14 to a medium high pressure (maybe about 40 MPa) higher than the pressure in common rail 16 to medium low pressure (maybe about 35 MPa). Leakage of the liquid fuel into the gaseous fuel includes setting a compression load on the inner tube 50 above a first predetermined threshold with the compression load adjuster 66 to create appropriate sealing forces on both ends of tube 50. Leakage of the second fuel to atmosphere may be inhibited by setting a compression load on the outer tube 40 above a second predetermined threshold with the second load adjuster 60 to create a seal between outer tube 40 and fuel injector 12. Leakage of gaseous fuel to atmosphere is inhibited by including at least one o-ring, such as o-ring 80 in contact with outer tube 40. Nevertheless, those skilled in the art will appreciate that other concentric tube supply arrangements could be utilized without departing from the present disclosure. However, in the illustrated embodiment, leakage and variations in geometrical tolerances in the various components of engine 5 and fuel system 10 can be accommodated by utilizing first and second compression load adjusters 60 and 66 to respectively adjust the compression loads in the outer tube 40 and the inner tube 50 individually.

The fuel system 10 according to the present disclosure also includes several subtle functions providing advantages over known dual fuel systems. Among these are independent injection control via separate valves and separate electrical actuators for each of the gas and liquid systems. Thus, the fuel injector 12 can be controlled to inject gaseous fuel only, liquid fuel only, both gaseous and liquid fuel simultaneously, and of course having non-injection mode when no injection occurs. Although the migration of gaseous fuel into the liquid fuel is generally inhibited by maintaining the liquid fuel common rail 14 at a higher pressure than the gaseous fuel common rail 16 other subtle but important features assist in preventing such leakage. Cross leakage issues are also inhibited by locating the liquid fuel supply in the inner tube 50, and locating the gaseous fuel supply to injectors 12 in the outer passage 49 between inner tube 50 and outer tube 40. By locating these passageways concentrically, each fuel injector 12 can be supplied with both fuels via one passageway through the engine housing 6 (head) rather than two passageways. Lubricity of the moving components within the fuel injector 12 are maintained by exposure to liquid diesel fuel. For instance, the guide clearance 93 associated with gas needle 73 is maintained with liquid diesel fuel to maintain lubricity, even though one end of the gas needle 73 is always exposed to gaseous fuel in gas nozzle chamber 91.

By utilizing the concentric supply strategy, the fuel system 10 of the present disclosure presents a potential opportunity for retrofitting existing engines with minimized engine cylinder head modifications. The structure of both versions of fuel injectors 12 also inhibits the leakage of gaseous fuel into the engine cylinder by locating both the gaseous fuel nozzle outlets 90 and the liquid fuel nozzle outlets 96 in a single tip component 71, rather than via some nested needle strategy of a type known in the art. Thus, the fuel injector 12 of the present disclosure avoids stacked tolerances and other uncertainties by making each of the gas and liquid needle structures completely independent in their movement, seating and biasing features. This strategy may better enable mass production of fuel injectors that perform consistently with the same control signals. Finally the engine 5 of the present disclosure contemplates both a normal dual fueling mode and a limp home mode in which only liquid fuel is injected. For instance, if a malfunction occurs in the gaseous fuel system or if the gaseous fuel supply is exhausted, the electronic controller 15 may cause or allow the engine to switch from a dual fueling mode to the limp home mode.

As best shown in FIG. 6, the dual fueling mode is characterized by a large gas injection quantity 138 and a small quantity injection 135 of liquid fuel. On the otherhand, the limp home mode may be characterized by no gas injection but a large quantity 136 liquid fuel injection. In addition, the normal dual fueling mode is characterized by the gas and liquid common rails 16 and 14 being maintained at medium low and medium high pressures, respectively. On the otherhand, the limp home mode may be characterized by the gaseous fuel common rail being allowed to decay to, or be maintained at, a low pressure, while pressure in the liquid common rail 14 is increased to a high pressure 133 (maybe greater than 100 MPa). When operating in the dual fueling mode, a relatively small injection of liquid distillate diesel fuel is compression ignited to in turn ignite a relatively large charge of gaseous fuel at least partially previously injected into the engine cylinder. On the otherhand, during a limp home mode, engine 5 functions as a somewhat conventional diesel engine in which a relatively large quantity of liquid fuel is injected at or around top dead center of the compression stroke to instantaneously ignite upon injection in a known manner.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. An engine comprising:
an engine housing defining a plurality of cylinders
a dual fuel system including a plurality of fuel injectors, each including an injector body with a tip component defining a plurality of gas nozzle outlets and a plurality of liquid nozzle outlets positioned for direct injection into one of the plurality of cylinders;
the dual fuel system including a plurality of outer tubes, each extending into the engine housing between a quill and one of the fuel injectors;
the dual fuel system including a plurality of inner tubes, each extending into the engine housing through one of the outer tubes and being compressed between a conical seat on the quill and a conical seat on the one of the fuel injectors;
the dual fuel system including a gaseous fuel common rail fluidly connected to each of the fuel injectors through the quill and an outer passage defined between the inner tube and the outer tube; and
the dual fuel system including a liquid fuel common rail fluidly connected to each of the fuel injectors through the quill and an inner passage defined by the inner tube.

2. The engine of claim 1 wherein the dual fuel system includes an electronic controller in control communication with a gas pressure control device operably coupled to the gaseous fuel common rail and in control communication with a liquid pressure control device operably coupled to a liquid fuel common rail;
the engine having a dual fueling mode in which the electronic controller is configured to maintain the gaseous fuel common rail at a medium low pressure and the liquid common rail at a medium high pressure;
the engine having a limp home fueling mode in which the electronic controller is configured to maintain the gaseous fuel common rail at a low pressure and the liquid common rail at a high pressure; and
the high pressure is greater than the medium high pressure, which is greater than the medium low pressure, which is greater than the low pressure.

3. The engine of claim 1 wherein the gaseous fuel common rail is fluidly connected to is at least one cryogenic liquefied gas tank with a first capacity;
the liquid fuel common rail being fluidly connected to at least one liquid tank with a second capacity; and
the first capacity is greater than the second capacity; and
the dual fuel system includes a drain return line extending between an injector drain outlet and the liquid tank.

4. The engine of claim 1 wherein two control valves of the fuel injector have a gas injection configuration at which the liquid fuel common rail is fluidly connected to a drain outlet of the fuel injector through a first pressure control chamber;
the two control valves have a liquid injection configuration at which the liquid fuel common rail is fluidly connected to the drain outlet through a second pressure control chamber;
the two control valves have a combined injection configuration at which the liquid fuel common rail is fluidly connected to the drain outlet through the first pressure control chamber and parallel through the second pressure control chamber;
the two control valves having a non-injection configuration at which the liquid fuel common rail is blocked from the drain outlet.

5. The engine of claim 4 wherein the fuel injector includes a gas needle positioned in the fuel injector with a guide surface extending in a guide component of the injector body between the first pressure control chamber and a gas nozzle chamber fluidly connected to the gaseous fuel common rail; and
a segment of the gas needle and the guide component defining a portion of an annular volume fluidly connected to the liquid fuel common rail.

6. The engine of claim 5 wherein the dual fuel system includes an electronic controller in control communication with a gas pressure control device operably coupled to the gaseous fuel common rail and in control communication with a liquid pressure control device operably coupled to a liquid fuel common rail;
the engine having a dual fueling mode in which the electronic controller is configured to maintain the gaseous fuel common rail at a medium low pressure and the liquid common rail at a medium high pressure;
the engine having a limp home fueling mode in which the electronic controller is configured to maintain the gaseous fuel common rail at a low pressure and the liquid common rail at a high pressure; and
the high pressure is greater than the medium high pressure, which is greater than the medium low pressure, which is greater than the low pressure.

7. The engine of claim 6 wherein the gaseous fuel common rail is fluidly connected to is at least one cryogenic liquefied gas tank with a first capacity;
the liquid fuel common rail being fluidly connected to at least one liquid tank with a second capacity; and
the first capacity is greater than the second capacity; and
the dual fuel system includes a drain return line extending between an injector drain outlet and the liquid tank.

8. The engine of claim 7 including a plurality of first compression load adjusters, each operably coupled to adjust a compression load on a different one of the inner tubes;
a plurality of second compression load adjusters, each operably coupled to adjust a compression load on a different one of the outer tubes; and
each combination of one of the first compression load adjusters, one of the second compression load adjusters, one of the outer tubes and one of the inner tubes has a common centerline.

9. A dual fuel system comprising:
a plurality of fuel injectors, each including an injector body with a tip component defining a plurality of gas nozzle outlets and a plurality of liquid nozzle outlets;
a plurality of outer tubes, each extending between a quill and one of the fuel injectors;
a plurality of inner tubes, each extending into the engine housing through one of the outer tubes and being compressed between a conical seat on the quill and a conical seat on the one of the fuel injectors;
a gaseous fuel common rail fluidly connected to each of the fuel injectors through the quill and an outer passage defined between the inner tube and the outer tube;
a liquid fuel common rail fluidly connected to each of the fuel injectors through the quill and an inner passage defined by the inner tube;
a plurality of first compression load adjusters, each operably coupled to adjust a compression load on a different one of the inner tubes; and a plurality of second compression load adjusters, each operably coupled to adjust a compression load on a different one of the outer tubes.

10. The dual fuel system of claim 9 wherein two control valves of the fuel injector have a gas injection configuration at which the liquid fuel common rail is fluidly connected to a drain outlet of the fuel injector through a first pressure control chamber;

the two control valves have a liquid injection configuration at which the liquid fuel common rail is fluidly connected to the drain outlet through a second pressure control chamber;

the two control valves have a combined injection configuration at which the liquid fuel common rail is fluidly connected to the drain outlet through the first pressure control chamber and parallel through the second pressure control chamber;

the two control valves having a non-injection configuration at which the liquid fuel common rail is blocked from the drain outlet.

11. The dual fuel system of claim 10 including an electronic controller in control communication with a gas pressure control device operably coupled to the gaseous fuel common rail and in control communication with a liquid pressure control device operably coupled to a liquid fuel common rail;

the electronic controller is configured to maintain the gaseous fuel common rail at a medium low pressure and the liquid common rail at a medium high pressure in a dual fueling mode;

the electronic controller is configured to maintain the gaseous fuel common rail at a low pressure and the liquid common rail at a high pressure in a limp home fueling mode; and the high pressure is greater than the medium high pressure, which is greater than the medium low pressure, which is greater than the low pressure.

12. The dual fuel system of claim 11 wherein the fuel injector includes a gas needle positioned in the fuel injector with a guide surface extending in a guide component of the injector body between the first pressure control chamber and a gas nozzle chamber fluidly connected to the gaseous fuel common rail; and a segment of the guide surface and the guide component defining a portion of an annular volume fluidly connected to the liquid fuel common rail.

13. The dual fuel system of claim 12 wherein each combination of one of the first compression load adjusters, one of the second compression load adjusters, one of the outer tubes and one of the inner tubes has a common centerline.

14. The dual fuel system of claim 13 wherein the gaseous fuel common rail is fluidly connected to is at least one cryogenic liquefied gas tank with a first capacity;

the liquid fuel common rail being fluidly connected to at least one liquid tank with a second capacity; and the first capacity is greater than the second capacity; and the dual fuel system includes a drain return line extending between an injector drain outlet and the liquid tank.

15. A method of operating an engine with a dual fuel system including a liquid fuel common rail and a gaseous fuel common rail fluidly connected to a plurality of fuel injectors by a plurality of outer tubes extending into the engine between a quill and one of the fuel injectors and a plurality of inner tubes extending into the engine through the outer tubes, the method comprising the steps of:

injecting gaseous fuel into an engine cylinder through a plurality of gas nozzle outlets of one of the fuel injectors; and injecting liquid fuel into the engine cylinder through a plurality of liquid nozzle outlets;

moving liquid fuel from the liquid fuel common rail to the one of the fuel injectors through the quill and an inner passage defined by the inner tube;

moving gaseous fuel from the gaseous fuel common rail to the one of the fuel injectors through the quill and an outer passage defined between the inner tube and the outer tube;

inhibiting liquid fuel leakage into the gaseous fuel by compressing the inner tube between a conical seat on the quill and a conical seat on the one of the fuel injectors;

inhibiting gaseous fuel leakage into the liquid fuel by pressurizing the liquid fuel rail to a greater magnitude than the gaseous fuel rail;

inhibiting gaseous fuel leakage into the engine cylinder by locating the gaseous nozzle outlets and the liquid nozzle outlets in a tip component of the one of the fuel injectors;

igniting the injected gaseous fuel by compression igniting the liquid fuel.

16. The method of claim 15 including the steps of:

switching from a dual fueling mode characterized by an injection of a small quantity of liquid fuel to a limp home mode;

the switching step includes raising pressure in the liquid fuel common rail and lowering pressure in the gaseous fuel common rail; and injecting and compression igniting a large quantity liquid fuel during the limp home mode.

17. The method of claim 16 including a step of inhibiting leakage of gaseous fuel to atmosphere by positioning at least one O-ring in contact with the outer tube.

18. The method of claim 17 wherein the step of inhibiting liquid fuel leakage includes individually adjusting a compression load in each of inner tubes with a different one of a plurality of first load adjusters; and the step of inhibiting leakage of gaseous fuel to atmosphere includes individually adjusting a compression load in each of outer tubes with a different one of a plurality of second load adjusters.

19. The method of claim 18 including a step of maintaining the liquid fuel common rail at a medium high pressure and the gaseous fuel common rail at a medium low pressure during the dual fueling mode; and maintaining the liquid fuel rail at a high pressure and the gaseous fuel common rail at a low pressure during the limp home mode.

20. The method of claim 19 wherein the step of inhibiting gaseous fuel leakage into the liquid fuel includes pressurizing a segment of a clearance between a guide surface of a gas needle and a guide component of the fuel injector with a fluid connection to the liquid fuel rail.

* * * * *